(12) United States Patent
Troyanker

(10) Patent No.: US 6,563,959 B1
(45) Date of Patent: May 13, 2003

(54) PERCEPTUAL SIMILARITY IMAGE RETRIEVAL METHOD

(75) Inventor: Vlad Troyanker, Sunnyvale, CA (US)

(73) Assignee: Pixlogic LLC, Los Altos, CA (US)

( * ) Notice: Subject to any disclaimer, the term of this patent is extended or adjusted under 35 U.S.C. 154(b) by 0 days.

(21) Appl. No.: 09/364,302

(22) Filed: Jul. 30, 1999

(51) Int. Cl.$^7$ .............................. G06K 9/36; G06K 9/00
(52) U.S. Cl. ..................... 382/282; 382/284; 382/164; 358/538
(58) Field of Search ................................. 382/306, 305, 382/282, 280, 250, 220, 209, 208, 201, 195, 190, 172, 165, 164, 162; 345/605, 604, 597, 593, 591, 589; 358/538, 527, 515; 707/7, 6, 4, 3, 1

(56) References Cited

U.S. PATENT DOCUMENTS

| | | | | |
|---|---|---|---|---|
| 5,517,334 A | * | 5/1996 | Morag et al. ................ | 358/518 |
| 5,553,157 A | | 9/1996 | Bourguignon et al. ...... | 382/131 |
| 5,579,471 A | | 11/1996 | Barber et al. ................ | 395/326 |
| 5,619,596 A | | 4/1997 | Iwaki et al. .................. | 382/278 |
| 5,647,058 A | * | 7/1997 | Agarwal et al. ............. | 395/601 |

(List continued on next page.)

FOREIGN PATENT DOCUMENTS

| WO | wo 9850869 | 11/1998 | ........... G06F/17/30 |
|---|---|---|---|
| WO | wo 9945483 | 9/1999 | ........... G06F/17/30 |

OTHER PUBLICATIONS

J.R. Smith, "Digital Video Libraries and the Internet", IEEE Communications, vol. 37, pp. 99–97, New York, N.Y., (Jan. 1999).

C. Poynton, "Frequently–Asked Questions about Color", http://home.inforamp.net/~poynton/ColorFAQ.html on Apr. 24, 2000.

C. Poynton, "Frequently Asked Questions about Color", © Dec. 30, 1999, http://home.inforamp.net/~poynton/PDFs/ColorFAQ.pdf on Apr. 24, 2000.

C. Poynton, "Frequently Asked Questions About Color", © Jan. 4, 1998, http://home.inforamp.net/~poynton/notes/colour_and _gamma/ColorFAQ.txt on Apr. 24, 2000.

C. Poynton, "Charles Poynton—Color technology", http://home.inforamp.net/~poynton/Poynton–color.html on Apr. 28, 2000.

(List continued on next page.)

Primary Examiner—Jayanti K. Patel
Assistant Examiner—Yosef Kassa
(74) Attorney, Agent, or Firm—Gallagher & Lathrop; Thomas A. Gallagher

(57) ABSTRACT

Method of effective search and retrieval through large collections of images is presented. Search criteria are based on perceptual similarity of images. Method is capable to process such images as bitonal, gray-scale and colorful, either of artificial or "real" world origin. Continuos-tone "real scene" images such as digitized still pictures and video frames are the primary objects of interest. Search operation starts from creating of an index out of a query image. Next, the index is to be applied as a key for searching through the index database. Index creation is a multi-step procedure, wherein the essential stages are: dissection of an image into areas of free shapes (spots) and computation of certain properties for each one. The properties are shape, color and relative position within the whole image. Spot shape is stored as derivatives of coefficients of DFT applied to a spot perimeter trace. Thus, every spot is represented by a set of numerical values (spot descriptor). Each image is represented in the database by plurality of its spot descriptors. A metric to compare spots in terms of their perceptual similarity is provided. Search results are presented as a scored list of relevant images where the score is based on their perceptual similarity to a query image.

15 Claims, 6 Drawing Sheets

U.S. PATENT DOCUMENTS

| | | | | |
|---|---|---|---|---|
| 5,666,212 A | | 9/1997 | Gilge | 358/432 |
| 5,684,890 A | | 11/1997 | Miyashita et al. | 382/154 |
| 5,751,286 A | | 5/1998 | Barber et al. | 345/348 |
| 5,754,676 A | | 5/1998 | Komiya et al. | 382/132 |
| 5,798,943 A | * | 8/1998 | Cook et al. | 364/526 |
| 5,825,910 A | | 10/1998 | Vafai | 382/132 |
| 5,852,823 A | | 12/1998 | De Bonet | 707/6 |
| 5,857,030 A | | 1/1999 | Gaborski et al. | 382/132 |
| 5,859,921 A | | 1/1999 | Suzuki | 382/118 |
| 5,872,865 A | | 2/1999 | Normile et al. | 382/224 |
| 5,893,095 A | | 4/1999 | Jain et al. | 707/6 |
| 5,896,462 A | | 4/1999 | Stern | 382/306 |
| 5,899,999 A | | 5/1999 | De Bonet | 707/104 |
| 5,910,999 A | | 6/1999 | Mukohzaka | 382/124 |
| 5,911,139 A | | 6/1999 | Jain et al. | 707/3 |
| 5,913,205 A | | 6/1999 | Jain et al. | 707/2 |
| 5,915,250 A | | 6/1999 | Jain et al. | 707/100 |
| 5,917,940 A | | 6/1999 | Okajima et al. | 382/173 |
| 5,923,776 A | | 7/1999 | Kamgar-Parsi | 382/173 |
| 5,926,568 A | | 7/1999 | Chaney et al. | 382/217 |
| 5,930,783 A | | 7/1999 | Li et al. | 707/1 |
| 5,933,518 A | | 8/1999 | Cohen-Solal | 382/132 |
| 5,933,524 A | | 8/1999 | Schuster et al. | 382/168 |
| 5,933,546 A | | 8/1999 | Stone | 382/278 |
| 5,933,823 A | | 8/1999 | Cullen et al. | 707/6 |
| 5,949,904 A | | 9/1999 | Delp | 382/165 |
| 6,081,276 A | * | 6/2000 | Delp | 345/431 |
| 6,246,804 B1 | * | 6/2001 | Sato et al. | 382/284 |

OTHER PUBLICATIONS

W.K. Pratt, "Digital Image Processing", John Wiley & Sons, pp. 449–451, 597–617 (1978).

T. Masters "Signal and Image Processing with Neural Networks", John Wiley & Sons, pp. 98–101, 115–121, 123–130 (1994).

H.S. Stone "Image Libraries and the Internet", IEEE Communications, vol. 37, pp. 99–106, New York, N.Y. (Jan. 1999).

* cited by examiner

PERCEPTUAL SIMILARITY IMAGE RETRIEVAL METHOD

MATERIAL SUBJECT TO COPYRIGHT PROTECTION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to image analysis and management systems. The invention is directed to organization of large arrays of visual information and their effective management. The method of processing the "real scene" digital images (acquired from digital cameras, scanners, etc.) is introduced in order to retrieve images on the basis of their visual similarity to a query image.

2. Description of the Related Technology

Modem scientific and industrial societies face a strong demand to introduce powerful and effective tools to manage and organize visual information, which is stored in an electronic memory. Nowadays, the world produces hundreds of thousands of digital images every day and this number has a trend to increase. The cause is obvious—image input devices have become cheaper, smarter, easier to use, smaller, and more reliable. However, large image databases collected by museums, libraries and commercial warehouses (e. g. Corbis) have little worth without simple and effective access methods. The invention addresses the fundamental problem—search and retrieval in an image database, where a query itself is presented in a form of image. The common name is Query-By-Pictorial-Example (QBPE). This is easy to use, powerful and modem approach to the visual information organization and access.

Significant advances have been taking place in this field over the last decade. Nevertheless, modem methods have several flaws. They use clumsy mechanism of defining and registering a number of image features. This causes long and non-straightforward dialog with the user, who is held responsible to form his/her query based on plurality of said image features. Those systems are almost unable to accept full colored images (24 and more bit per pixel) as a query. Some researches suggest using primitive integral characteristics of image, like color histograms, color moments or extremely downsized copy of an image, for means of perceptual similarity search. This approach might be useful in applications where images are taken in fixed projections because it does not tolerate change of the projection, scale and, especially, change of objects composition within the image. Finally, the above mentioned flaws cause lack of accuracy and/or a too narrow applicability, which prevents broad use of those methods.

BRIEF SUMMARY OF THE INVENTION

Most of conventional methods use either primitive integral image features, i.e., color histograms and color moments, or complicated sets of basic features. The invention approaches the problem of image indexing in a different way. When given image is to be inserted into a database, search index is to be created as described below. The image is being dissected on "spots" of free form. Definition of a spot is similar to a dictionary meaning of this word. Spot is a connected set of pixels of similar color and brightness. Shape of a spot is represented as derivatives of Fourier transformation of a spot perimeter. Shape, color and relative position within an image compose a spot descriptor. Index of the entire image is a plurality of all its spot descriptors. Thus, each image in a database is associated with numerical index created as described above. Further, both terms will be used throughout the document: index when common meaning of this term is prevailing and spot descriptor when properties of index, made up by this embodiment, are being discussed. Such representation of an image has the following significant advantages:

There is a comparison procedure, defined for any two spots, to get their perceptual similarity in numerical form.

Effectiveness. Indexes comparison procedure is quick (computationally inexpensive).

Compactness. Size of the index depends on amount of information image carries but, on average, it is thousand times less that image data itself. Usually, it does not exceed 5–10 hundred bytes.

Intrinsic separation, which means that an object represented by a group of spots can be positively identified in other images regardless to the rest of their content. For example, image of a telephone receiver will be found presented standalone as well as within the image containing many other objects (FIG. 6).

Accuracy or capability to disregard subtle differences and noise while detecting common traits in image areas, which have totally different pixel representation.

BRIEF DESCRIPTION OF THE DRAWINGS

The invention will be described in further detail with reference to the accompanying drawings, in which.

DETAILED DESCRIPTION OF THE INVENTION

The discussion of the preferred embodiment will be organized into several principal sections. First section—

"Structure" explains general design of the embodiment. Next section is "Detailed design", where preferred embodiment will be described in detail. It also displays features distinguishing the invention from what is old. The "Applications" section explains practical applications of the invention.

Structure

Prior to the detailed explanation of the invention, it is necessary to define term index, which will be frequently used in the description. Index is a specifically prepared metadata, which allows simplifying and speeding up search in certain set of data. Process of creating said index heavily uses knowledge about nature and structure of the data being indexed. One skilled in database art can see that this definition is not different from the commonly used.

The embodiment provides two main functions:

Indexing. Creation of a searchable index for a given image and storing it into index database.

Search. Creation of a searchable index for a given image and scanning the index database against that index to find a number of images perceptually closest to the query image.

Figure 1:
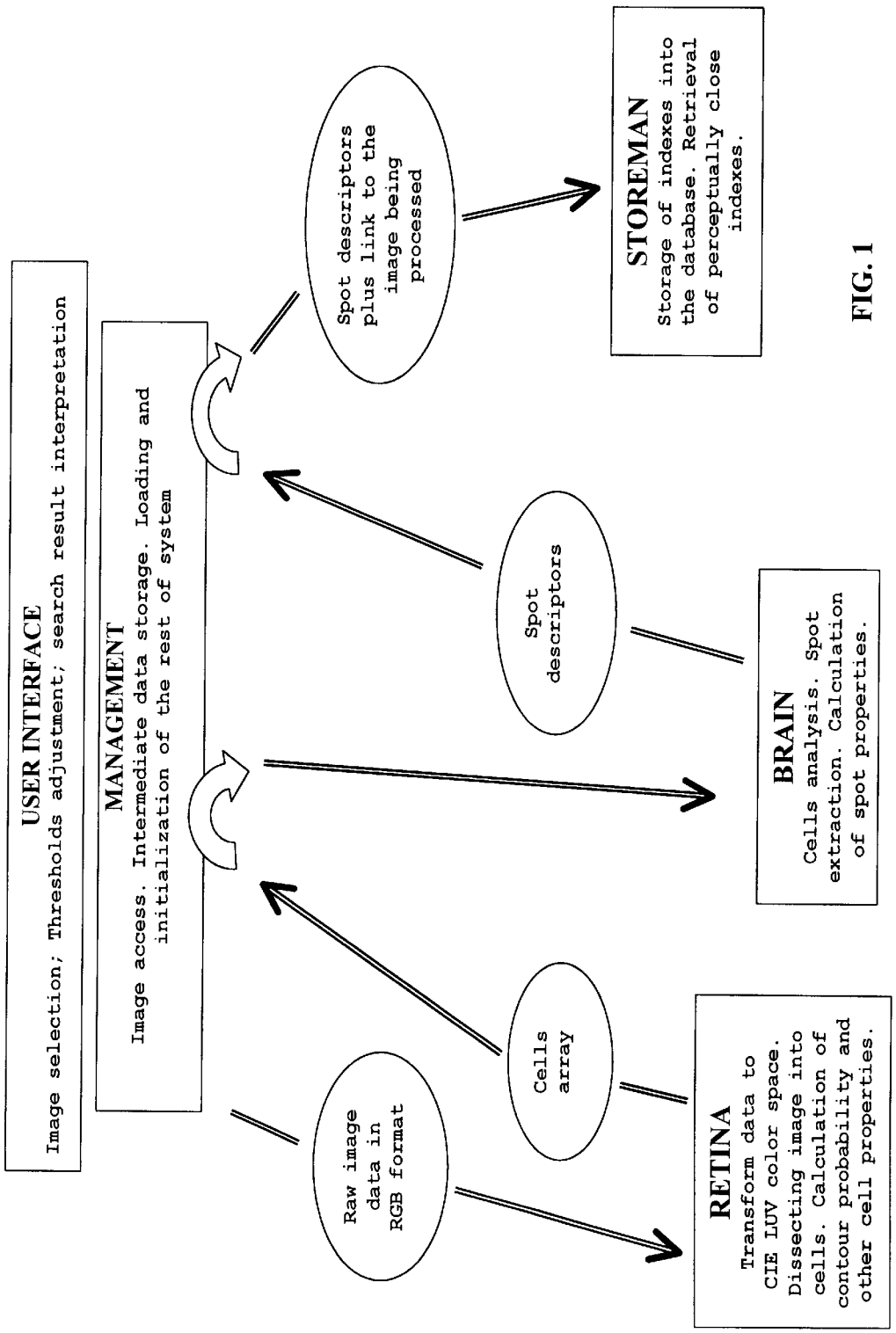
FIG. 1 depicts a block diagram of the modules of the preferred embodiment.

The embodiment is comprised of the following parts: MANAGEMENT is specific module that is responsible for loading all other modules, their accurate initialization, passing data between other modules, temporal storage of said data, and processing of user's commands. All other modules are limited in communication by MANAGEMENT only (FIG. 1). Programming interfaces of those modules are strictly defined. RETINA conducts preprocessing of input image, which is provided by MANAGEMENT in RGB or Grayscale format. RETINA transforms raw input data into a form that is convenient for analysis and content extraction. BRAIN analyses data received from RETINA in order to extract image content in a compact but informative manner. Further, data created by module BRAIN is being passed to STOREMAN that handles indexes storage, search of similar indexes in the database and creation of the ranked result lists. Principles of all mentioned procedures are the matter of the invention and will be described in full detail in the "Detailed design" section below.

Detailed Design

Figure 2:
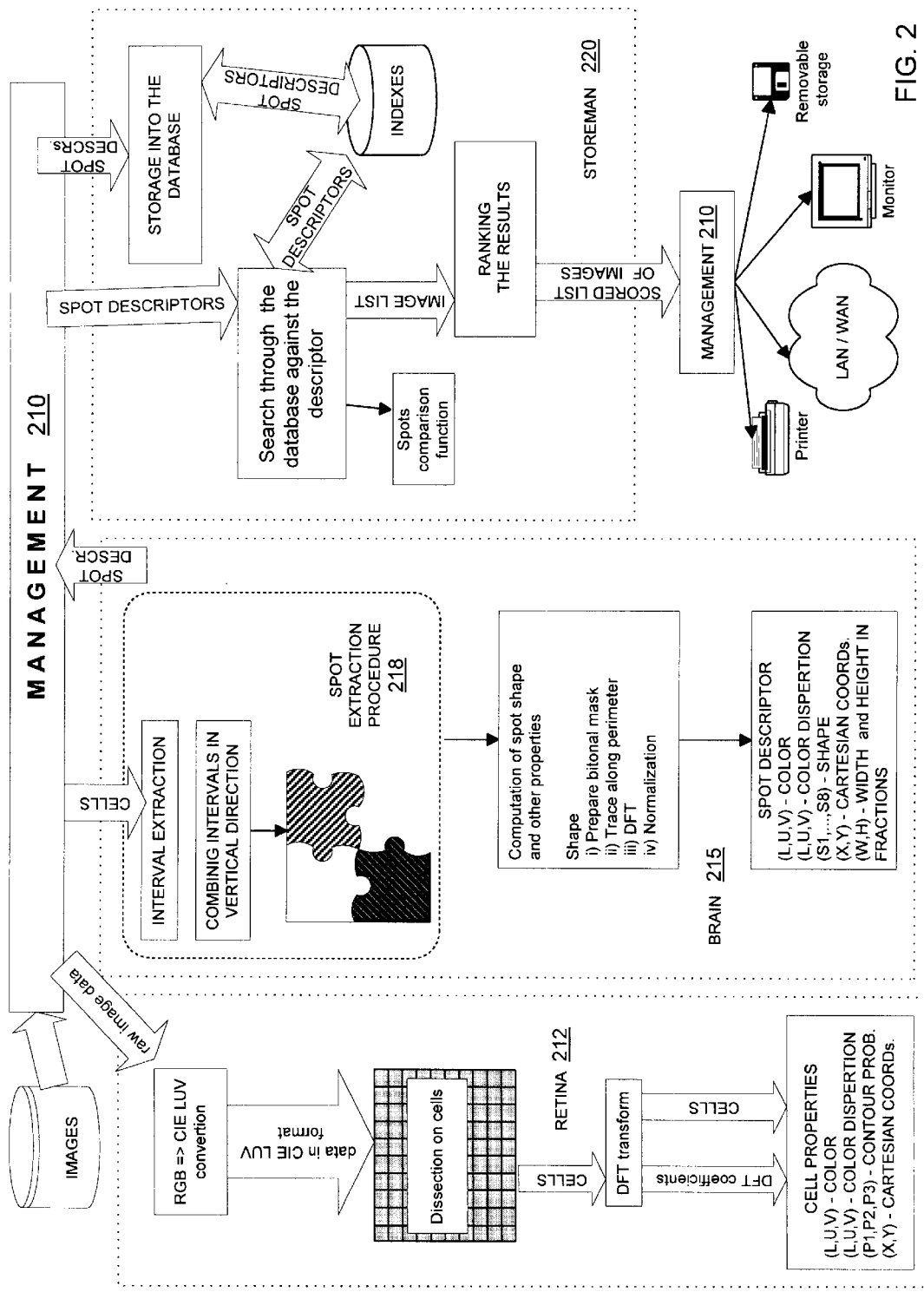
FIG. 2 depicts a detailed functional block diagram of the preferred embodiment. Thick arrows represent data flow while thin arrows show control flow and control dependencies.

FIG. 2 will be referred to throughout this section. It depicts data flow inside the system and sequence of operations, bringing all the important parts within one sight. Module RETINA 212 receives input image data from MANAGEMENT 210 in RGB format. This format was designed mainly for output devices, such as display. However, it does not fit the needs of image analysis due to the fact that it is device-dependant, does not provide reasonable way to determine perceptual difference between its values and is non-uniform across its range. That is the reason why data is to be transformed into another color space—CIE LUV.

In 1931, the Commission Internationale de l'Eclairage (CIE) developed a device-independent color model based on human perception. <<The CIE XYZ model, as it is known, defines three primaries called X, Y and Z that can be combined to match any color humans see. This relates to the tristimulus theory of color perception, that states that the human retina has 3 kinds of cones with peak sensitivities to 580 nm ("red"), 545 nm ("green") and 440 nm ("blue").>> [5] However, <<The XYZ and RGB systems are far from exhibiting perceptual uniformity . . . So, in 1976 the CIE standardized L*u*v* system, sometimes referenced as CIE LUV.>>[5] Prior to continuance of the description, it is necessary to explain the term perceptual uniformity. <<A system is perceptually uniform if a small perturbation to a component value is approximately equally perceptible across the range of that value. The volume control on a radio is designed to be perceptually uniform: rotating the knob ten degrees produces approximately the same perceptual increment in volume anywhere across the range of the control.>> [5] CIE LUV color space has the following properties: it is device-independent; there is a simple formula to get perceptual difference between its values; it is perceptually uniform; brightness and chomaticity (colorfulness) are separated into different coordinates. Due to such benefits, CIE LUV is state of the art, the best modem science can offer for computerized color analysis.

After the data is transformed into the new color space, input image is to be dissected into small rectangular areas of fixed size. 8×8 pixel was chosen in this embodiment, which serves best for images with resolution of 150–400 dpi. However, this size may vary in other embodiments upon input images resolution. Thus, each area contains 8×8=64 numerical triplets. In favor of the concise description, such areas will be further referred as "cells". Then, Discrete Fourier Transformation (DFT) is to be executed on each cell. Said transformation is to be done upon each of three color coordinates independently. In the result spectrum, low frequencies represent changes across whole cell while high frequencies reflect difference between neighbor pixels. Probability of a contour crossing a given cell is to be calculated based on amplitudes of low frequencies. The following properties are to be calculated for every cell: contour probability, average cell color, its color dispersion, and position within whole image. An array of cells is to be passed to the module BRAIN 215 for analysis. Cell format is much more convenient (practical) for effective computerized analysis in comparison to RGB. It has 64 times less elements per image, color description allows to get perceptual difference, and, in conjunction with probability of contour inside the cell, it provides all necessary information for content extraction thereafter.

Figure 3:
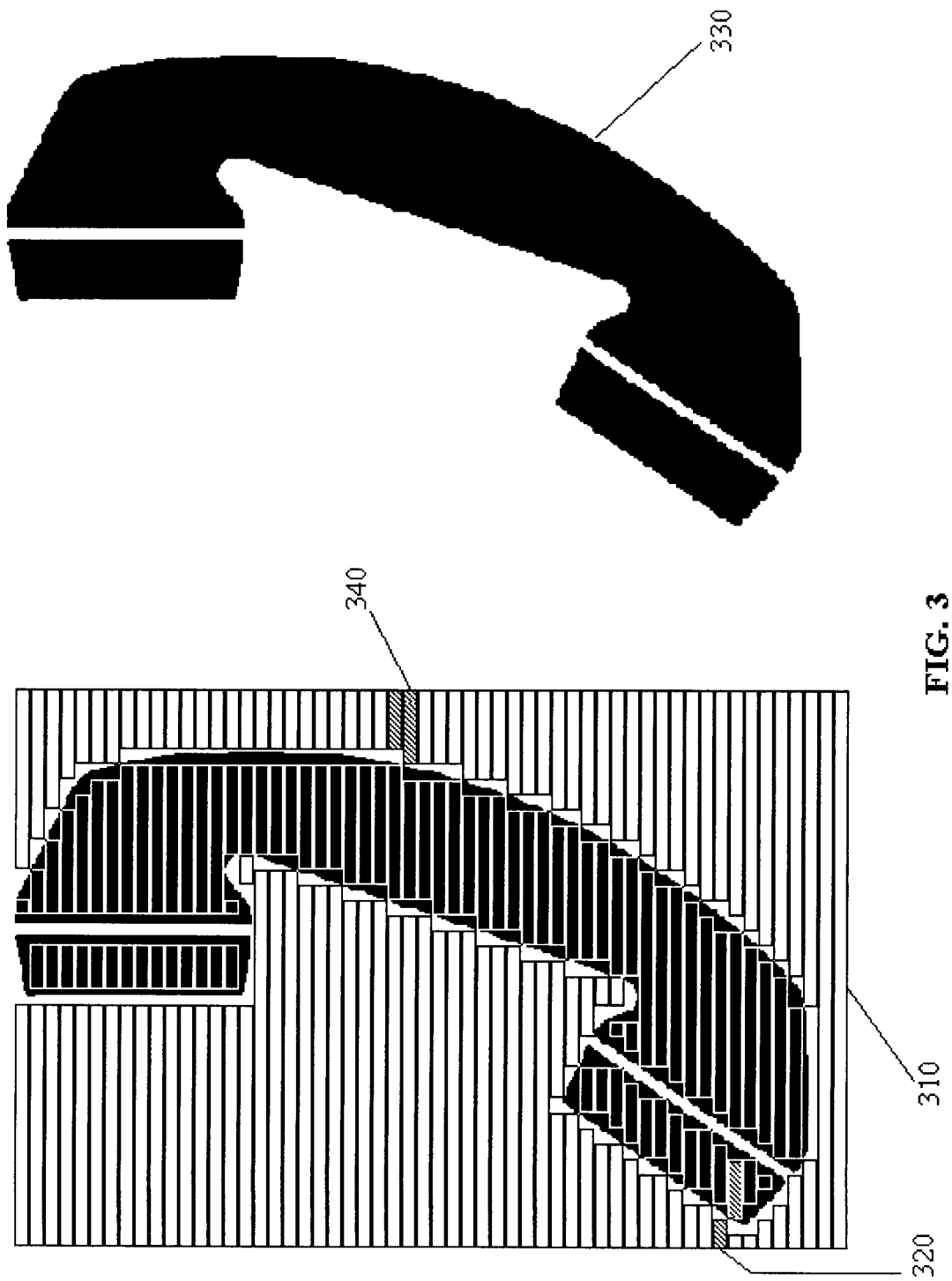
FIG. 3, wherein image 330 shows telephone receiver and is given for means of comparison; picture 310 illustrates the same image dissected on intervals; 320 and 340 illustrates interval connectivity. Specifically, 340 highlights two connected intervals, while 320 shows example of not connected intervals.

Next, array of cells is to be analyzed in the module BRAIN, which performs spot extraction 218. This is a multistage iterative procedure, which begins from scanning cell array line by line. Intervals are to be found within each line of cells. An interval is a group of one or more neighboring cells within given line. All cells pertaining to a certain interval are of similar color and brightness. A variable threshold is used to determine what is similar and what is not. The threshold may be setup by user or receive its default value from the system. Process of joining cells into intervals is iterative, meaning that at the beginning only perceptually most close cells are to be joined. Then threshold is being increased to allow more distant cells to join certain interval. During the last cycle of the procedure, all standalone cells form their own intervals. Picture 310 of FIG. 3 illustrates how image of telephone receiver is dissected into the intervals by method just described. It is the stage where information about possibility of contour being within the cell is taken in account. Cells with high probability of contour crossing them are being used as natural dividers between intervals.

Further, the intervals extracted at the previous stage are to be joined in vertical direction. The same principle as above is applied. All intervals are being scanned repeatedly. Connected intervals with perceptual difference, which is less then current value of the threshold, join. At the next cycle, the threshold is being increased and the process recommences. Thus, when all intervals are assigned to a certain group (spot) the procedure stops. Spot is a group of intervals having relatively same color and brightness. All intervals within a spot are connected. Any two intervals are connected only if they lay on consecutive (neighbor) lines and interlay in vertical projection. Referring to FIG. 3, two connected intervals 340 are shown. While intervals 320 lying on consecutive lines but do not interlay and therefore are not connected. Spots may contain each other.

Figure 4:
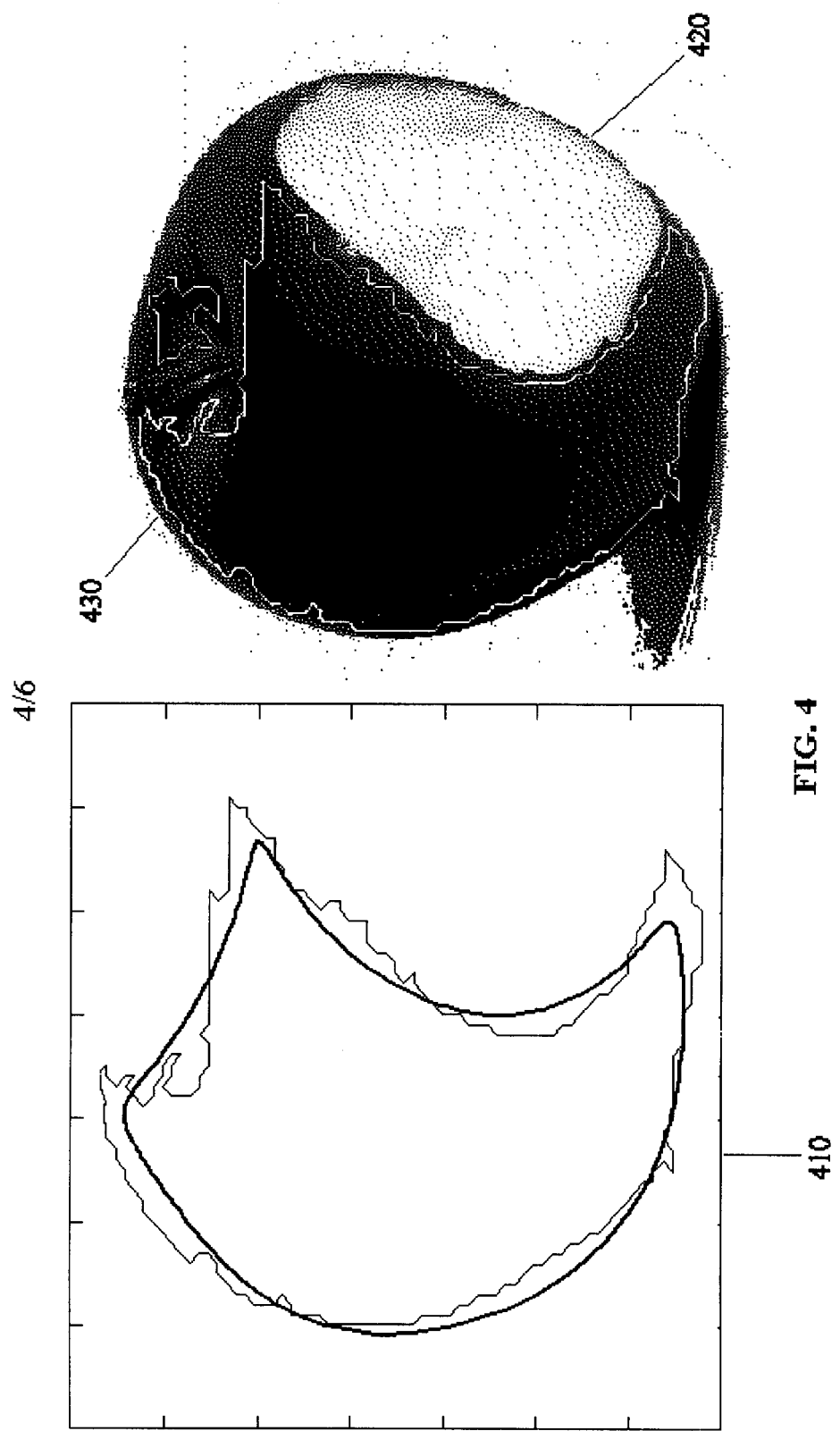
FIG. 4, wherein line 430 outlines the spot, which is found on image of an apple 420. Graph 410 depicts the same spot (thin line) and its shape representation (thick line) used as part of index for search purposes.

Form of a spot is to be computed by the following method. As explained above, a spot consists of intervals, which, in their turn, consist of cells. A copy of a spot is to be made where each cell is being copied into one bit of black-and-white raster. In other words, bitonal copy (mask) of spot is to be prepared. Said mask is to be scanned along its perimeter. Every perimeter point gives a pair of numbers, which are its Cartesian coordinates. The sequence of numbers made up through scanning spot perimeter is periodic, as perimeter, by definition, is an enclosed line. Then, Discrete Fourier Transformation is to be applied to that numerical series. In the resultant spectrum, amplitudes of several first frequencies are to be selected. The number of frequencies may vary, affecting only precision of form representation. The common term for spectrum processing like this is zone coding. Four amplitudes are used in the preferred embodiment. Only low frequencies are subject of interest as they carry the majority of information [2] about a shape while disregarding pixel-size perturbations and noise added due to spot extraction procedure. FIG. 4 illustrates that concept. Line 430 demonstrates outlined spot, which is found on the image of apple 420. On 410 the same spot (thin line) is shown as it was found and the shape restored from the spot descriptor (thick line) calculated according to the presented method. This shape representation has considerable advantages as follows:

The shape representation is extremely compact (4 amplitudes=8 numbers, each frequency has two components due to the structure of Fourier coefficients).

Number of values representing a shape does not depend on the length of spot perimeter.

It is free from high frequency noise.

It is the closest to the original shape in term of the square sum metric.

Amplitudes of selected frequencies are being normalized to be independent from image scale, which might be volatile due to certain registration equipment nature (i.e., camera focus length). Normalization is to be performed by dividing all amplitudes on amplitude of the coefficient representing first frequency. Assuming that a spot has a convex hull, the amplitude of the first coefficient would be the largest among of all the rest. It also conveys most of the information about spot size. Thus, after the normalization, amplitudes from different spots can be compared directly as scale information has been discarded.

Spot shape represented by said eight numbers is to be stored into a spot descriptor. Spot descriptor is a data structure, which keeps spot properties. Besides shape, spot descriptor also contains spot color, color dispersion across the spot, relative size and position within the whole image, and spot hierarchy information. Relative size is a ratio of the spot width and height measured in pixels to the image width and height respectfully. Further, spot descriptor is being passed to module STOREMAN 220 of FIG. 2 for placing into index database in case of indexing operation or to perform search in the database against that descriptor in case of search operation. Plurality of all spot descriptors is an index of a given image.

The important feature of the described model is its intrinsic segmentation. Any particular spot or set of spots subjected to a search will be detected in other images regardless of context, location, positional rearrangement, rotation, and/or scale. It is the key feature and a basis of sufficient system accuracy given that in the real life images are produced under a huge variety of acquisition circumstances.

Module STOREMAN conducts the following operations:

Storing an index into the database.

Search through the database to find indexes the closest to a given one.

Ranking the sought images and preparation of output results.

Storing an index and a link to the proper image into the database is a common operation. Person skilled in the pertaining art does not need further explanation of said operation. Implemented index storage subsystem has an open architecture. Thus, such routine operations as memory management, maintenance of database integrity, transaction flow control, and collision detection could be given up to any general purpose Database Management System. The similarity search will be fully explained below.

Search procedure consists of sequential scanning through the database, where each retrieved spot descriptor is to be compared with a query descriptor. Comparison of two spot descriptors is simple and computationally inexpensive. It starts from comparison of relative sizes of those spots. If difference appears to be significant, spots are declared as most distant from each other (incomparable). For instance, it does not make sense to compare a spot that occupies half of one image with another spot that is only 1/36 of image area. Otherwise perceptual difference will be calculated. As defined in CIE LUV standard, the difference is $\sqrt{(L_1-L_2)^2+(U_1-U_2)^2+(V_1-V_2)^2}/C$, where L—brightness; U, V—colorfulness; and C—normalization constant. Afterwards, shape difference is to be calculated as follows:

$$\sum_N |s_n - x_n| \Big/ \sum_N \max(s_n, x_n),$$

where $x_1, \ldots, x_n$—coefficients representing shape of a query spot; $S_1, \ldots, S_n$ coefficients representing shape of current spot retrieved from the database; N—number of values in representation. Thus, only two numbers express the final difference between two spots: color difference and shape difference. Both numbers are ranged equally as 0 . . . 1. A user can control how important each criterion is. Their mutual importance is defined in a scale of 0 . . . 100. Both values are equally important [100;100] if no provisions have been made. As scanning through the database is over, sorting is to be performed in order to rank the results according to their similarity to the query spot. Both differences sum up together in order to assign a scalar similarity score to each of the retrieved spot. That procedure is to be repeated for each spot in query image; then, results are to be merged into a single ranked list. Final list ranked according to perceptual similarity is to be displayed on user interface or may be transferred for further processing.

Applications

Figure 5:
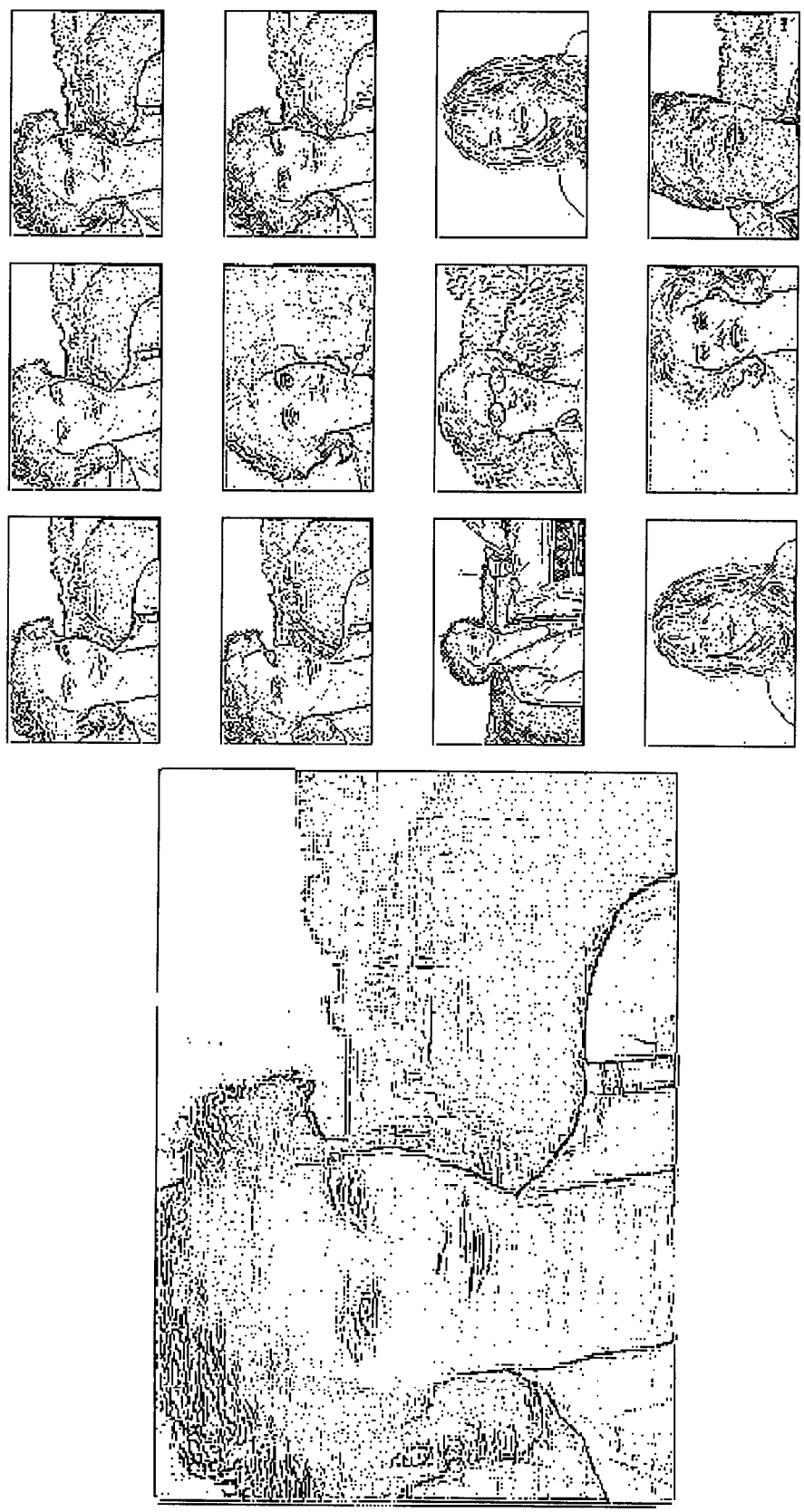
FIG. 5 is an exemplary screen that shows the query results where all indexed pictures are video frames. The big left-hand picture is the query image. The right hand thumbnails are the most relevant images found according to the present method.
Figure 6:
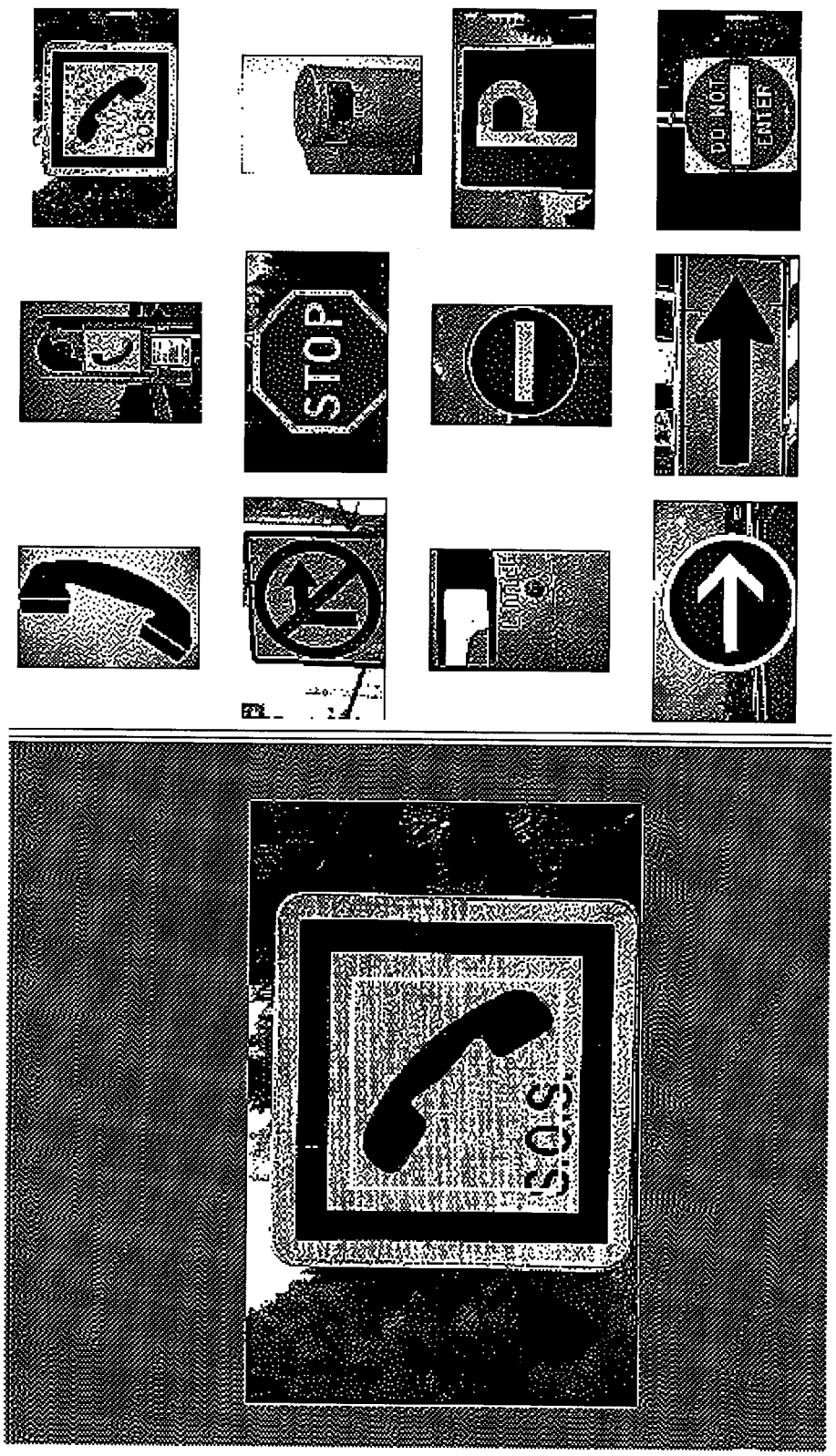
FIG. 6 is an exemplary screen that shows the query results where all indexed pictures acquired from photo camera. The big left-hand picture is the query image. The right hand thumbnails are the most relevant images found according to the present method.

Preferred embodiment will be useful in solving number of practical problem. The invention's approach, applied to image analysis, is general and does not provide advantages to any particular class of images. Thus, the best applications to utilize the present invention will be those where majority of processed images are non-specific, such as digitized still pictures, video frames, images created in graphic editors, etc. Term specific refers to the pictures taken from atmosphere or space, medical images etc., in other words, images pertaining to a very specific art or to a specific registration equipment. FIGS. 5–6 illustrate typical search operation, where the big left-hand picture is the query image and right-hand thumbnails are most relevant images found.

The major applications of the invention are the follows:

Image search in the Internet;

Search in image catalogs, archives and image warehouses;

Automatic filtering and creation annotations for video;

Search in a video.

One of the applications—the Internet search will be described. Nowadays, the Internet search servers gained significant importance and popularity. Giants of Internet industry such as Yahoo, Lycos, Infoseek, and many minors, do business by searching and compiling textual information in the Internet. However, the research [3]. shows that images now constitute 78.7 % of the Internet traffic. Users demand as simple and powerful search tools for images as they already have for textual information. They want to form a query in QBPE format or, in other words, ability to start a search from an image as a search sample. Here, the invention will provide users with general, accurate and easy to use tool for searching through large image collections. Typical scenario consists of the following steps:

User working with Internet browser selects an image or a part of image as subject of search;

Searchable index is to be calculated on local computer, as computational demand of the method is within capabilities of modern PCs;

Created compact index is being transferred to the search server via the Internet;

The server conducts search through its database and returns results in a form of URLs list addressing where relevant images reside. Thumbnails of said images can also be presented to the user to help him verify accuracy of the results immediately;

The server permanently scans the Internet indexing images, maintains and updates index database.

The above detailed description has shown, described, and pointed out the novel features of the invention. However, certain changes may be made, where mentioned in the description, without departing from scope of the invention. Accompanying drawings shall be interpreted as illustrative and not in a limiting sense.

What I claim as my invention is:

1. A method for characterizing a digital image represented by an array of pixels, comprising dividing the pixel array into a plurality of cells, each cell comprising a plurality of pixels, calculating properties of individual cells, joining neighboring cells into a plurality of spots based on the similarity of cell properties said cell properties including color characteristics and position within the image, and calculating properties of spots to provide a set of spot descriptors for respective spots including determining shape and color characterisics of spots and their relative position within the image, whereby the resulting sets of spot descriptors characterize the digital image.

2. A method according to claim 1 wherein each cell comprises substantially the same number of pixels.

3. A method according to claim 1 wherein calculating properties of individual cells includes determining the color characteristics of cells.

4. A method according to claim 3 wherein the color characteristics of cells are determined in a perceptually uniform color space.

5. A method according to claim 1 wherein calculating properties of individual cells includes determining the probability of contours crossing cells.

6. A method According to claim 5 wherein determining the probability of contours crossing cells includes applying a Discrete Frequency Transform to data representing cells.

7. A method according to claim 5 wherein calculating properties of individual cells further includes determining the color characteristics of cells.

8. A method according to claim 1 wherein joining neighboring cells includes an iterative process that applies a plurality of different similarity thresholds.

9. A method according to claim 1 wherein the cell properties used as a basis for joining neighboring cells into a plurality of spots further includes the probability of a contour crossing a cell.

10. A method according to claim 1 wherein the properties of spots calculated to provide a set of spot descriptors for respective spots further includes determining the shape of spots.

11. A method according to claim 10 wherein spot shapes are represented by amplitudes of coefficients of Discrete Fourier Transformations applied to spot perimeters.

12. A method according to claim 11 wherein the coefficient amplitudes are normalized.

13. A method according to claim 1 wherein spot shapes are represented by amplitudes of coefficients of Discrete Fourier Transformations applied to spot perimeters.

14. A method according to claim 13 wherein the coefficient amplitudes are normalized.

15. A method according to claim 1 further comprising transforming the pixel array into a perceptually uniform color space before dividing the pixel array into a plurality of cells.

* * * * *